(12) United States Patent
Jeong et al.

(10) Patent No.: US 8,832,199 B2
(45) Date of Patent: Sep. 9, 2014

(54) METHOD AND APPARATUS FOR CONNECTING DEVICES

(75) Inventors: Jin-Guk Jeong, Yongin-si (KR); Jae-Seok Park, Seoul (KR); Je-Hyok Ryu, Suwon-si (KR); Nam-Hoon Kim, Suwon-si (KR); Mu-Hong Byun, Suwon-si (KR); Young-Min Won, Suwon-si (KR); Jung-Hyun Oh, Seongnam-si (KR); Jeong-Soo Lee, Suwon-si (KR); Eun-Young Song, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 70 days.

(21) Appl. No.: 13/464,530

(22) Filed: May 4, 2012

(65) Prior Publication Data

US 2012/0284342 A1      Nov. 8, 2012

(30) Foreign Application Priority Data

May 4, 2011    (KR) ................. 10-2011-0042634

(51) Int. Cl.
*G06F 15/16*    (2006.01)
*H04L 29/08*    (2006.01)

(52) U.S. Cl.
CPC ............... *H04L 67/16* (2013.01); *H04L 67/24* (2013.01)
USPC .......................................... 709/205; 709/227

(58) Field of Classification Search
CPC ................. H04L 67/16; H04L 67/24
USPC .................. 709/200–205, 217–227, 228
See application file for complete search history.

(56) References Cited

U.S. PATENT DOCUMENTS

| | | | |
|---|---|---|---|
| 7,149,504 B1 * | 12/2006 | Weaver et al. | 455/414.2 |
| 7,483,980 B2 * | 1/2009 | Thomas | 709/225 |
| 7,526,278 B2 * | 4/2009 | Link et al. | 455/414.1 |
| 7,917,576 B1 * | 3/2011 | Kling | 709/203 |
| 8,005,485 B2 * | 8/2011 | Starr et al. | 455/456.1 |
| 8,165,598 B2 * | 4/2012 | Tran et al. | 455/456.1 |
| 8,335,524 B2 * | 12/2012 | Shutter | 455/456.3 |
| 8,396,002 B2 * | 3/2013 | Marshall-Wilson | 370/252 |
| 8,423,003 B2 * | 4/2013 | Sarukkai et al. | 455/414.3 |
| 8,537,797 B2 * | 9/2013 | Narkar et al. | 370/338 |
| 8,588,816 B2 * | 11/2013 | Collins | 455/456.3 |
| 2003/0134648 A1 * | 7/2003 | Reed et al. | 455/456 |
| 2007/0072591 A1 * | 3/2007 | McGary et al. | 455/414.1 |

(Continued)

FOREIGN PATENT DOCUMENTS

| | | |
|---|---|---|
| EP | 1718030 A1 | 11/2006 |
| KR | 2003-0042063 | 5/2003 |

(Continued)

OTHER PUBLICATIONS

European Search Report dated Jul. 4, 2012 in connection with European Application No. 12162468.8.

(Continued)

*Primary Examiner* — Moustafa M Meky

(57) ABSTRACT

A system and method is capable e of connecting devices including receiving from a first device a request to select a plurality of second devices according to predetermined conditions required by the first device. The system also can generate a virtual device channel for connecting the plurality of second devices to the first device.

18 Claims, 6 Drawing Sheets

(56) References Cited

U.S. PATENT DOCUMENTS

| | | | |
|---|---|---|---|
| 2007/0201376 A1* | 8/2007 | Marshall-Wilson | 370/252 |
| 2008/0081640 A1* | 4/2008 | Tran et al. | 455/456.3 |
| 2008/0255954 A1* | 10/2008 | Leung et al. | 705/14 |
| 2009/0138593 A1 | 5/2009 | Kalavade | |
| 2009/0163227 A1* | 6/2009 | Collins | 455/456.3 |
| 2009/0233624 A1 | 9/2009 | Lee | |
| 2009/0328113 A1* | 12/2009 | van de Klashorst | 725/87 |
| 2010/0023387 A1* | 1/2010 | Pan | 705/14.4 |
| 2010/0107221 A1 | 4/2010 | Rahul et al. | |
| 2012/0123867 A1* | 5/2012 | Hannan | 705/14.58 |
| 2012/0271684 A1* | 10/2012 | Shutter | 705/14.1 |

FOREIGN PATENT DOCUMENTS

| | | |
|---|---|---|
| KR | 10-2005-0017256 | 2/2005 |
| KR | 10-0908613 | 7/2009 |
| KR | 10-2009-0109795 | 10/2009 |
| WO | WO 2006/007439 A1 | 1/2006 |
| WO | WO 2008/052188 A2 | 5/2008 |
| WO | WO 2008/135848 A2 | 11/2008 |

OTHER PUBLICATIONS

International Search Report dated Oct. 25, 2012 in connection with International Application No. PCT/KR2012/002608.

Written Opinion of International Searching Authority dated Oct. 25, 2012 in connection with International Application No. PCT/KR2012/002608.

* cited by examiner

METHOD AND APPARATUS FOR CONNECTING DEVICES

CROSS-REFERENCE TO RELATED APPLICATION(S) AND CLAIM OF PRIORITY

The present application is related to and claims the benefit of Korean Patent Application No. 10-2011-0042634, filed on May 4, 2011, in the Korean Intellectual Property Office, the disclosure of which is incorporated herein in its entirety by reference.

TECHNICAL FIELD OF THE INVENTION

The present invention relates to a method and apparatus for connecting devices, and more particularly, to a method and apparatus for connecting devices for selecting a desired device group easily.

BACKGROUND OF THE INVENTION

Connections and data exchanges between devices are performed to copy or reproduce contents such as images, video, audio, and documents. For connecting devices, a device corresponding to a source and a device corresponding to a destination need to be predetermined in order to transfer data or messages there-between.

In addition, current connection between devices is a static connection using uniform resource identifier (URI) or Internet protocol (IP) address, and no way exists to search for desired device group and connect to the device group and most of the connections are P2P connection.

SUMMARY OF THE INVENTION

To address the above-discussed deficiencies of the prior art, it is a primary object to provide a method and apparatus for connecting devices, in which a desired device group can be selected easily by generating a virtual device channel to a device group that is wanted to be selected by a device and wherein selection of the desired device group can be actively changed.

According to an aspect of the present invention, there is provided a method of connecting devices, the method comprising: receiving from a first device a request to select a plurality of second devices according to predetermined conditions required by the first device; and generating a virtual device channel for connecting the plurality of second devices to the first device.

The method of connecting devices may further comprise receiving information related to the plurality of second devices from the plurality of second devices; and transmitting the received information related to the plurality of second devices to the first device via the virtual device channel.

The method of connecting devices may further comprise processing the received information related to the plurality of second devices, wherein the transmitting of the received information related to the plurality of second devices to the first device comprises transmitting the processed information to the first device via the virtual device channel.

The method of connecting devices may further comprise receiving information from the first device; and transmitting the receive information to the plurality of second devices via the virtual device channel.

The information related to the second device may be location information of the plurality of second devices.

At the least one of the information related to the second device and the processed information may be formed as a structured message in a machine readable language.

The structured message can be formed in one of JavaScript object notation (JSON), eXtensible markup language (XML), resource description framework (RDF), or Web ontology language (OWL).

The request to select can comprise a request to follow the plurality of second devices, and the method further comprising setting a following relationship between the plurality of second devices and the first device.

The setting of the following relationship between the first device and the plurality of second devices can comprise setting a following relationship so that the first device follows the plurality of second devices.

The setting of the following relationship between the first device and the plurality of second devices can comprise setting a following relationship so that the plurality of second devices follows the first device.

According to another aspect of the present invention, there is provided an apparatus for connecting devices. The apparatus includes a communication unit that can receive, from a first device, a request to follow a plurality of second devices according to predetermined conditions required by the first device; and a control unit that can generate a virtual device channel to connect the plurality of second devices to the first device and set a following relationship between the first device and the virtual device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Embodiments of the present invention will be described with reference to accompanying drawings.

Figure 1:
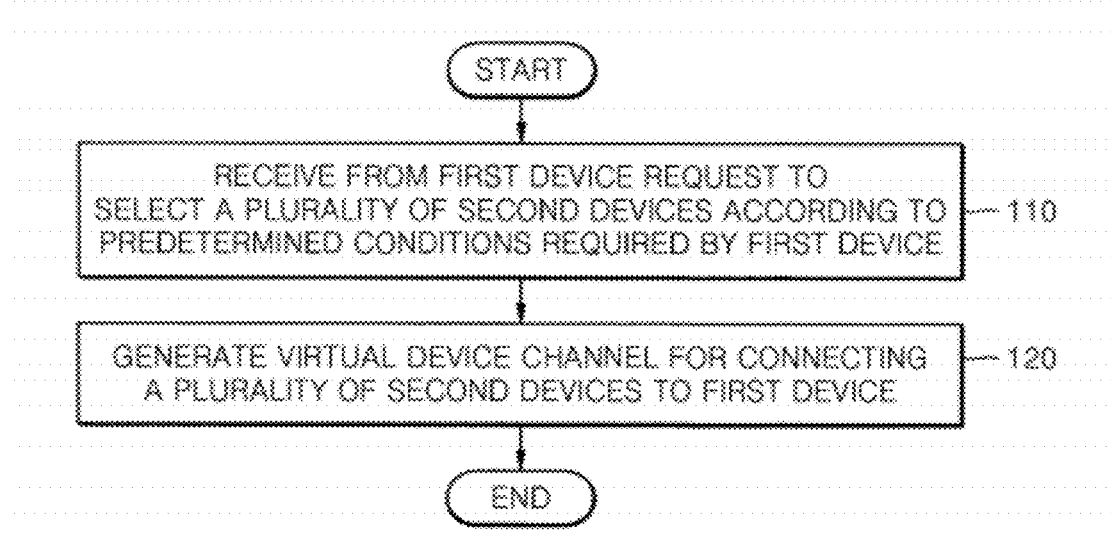
FIG. 1 illustrates a method of connecting devices according to an embodiment of the present invention.

FIG. 1 illustrates a method of connecting devices according to an embodiment of the present invention.

Referring to FIG. 1, in operation S110, a device connecting apparatus receives, from a first device, a request to select a plurality of second devices according to predetermined conditions required by the first device. The first device requests to select a plurality of devices included in a certain range, that is, a device group, not a single device. For example, the first device, such as a Galaxy smart-phone, can request to select a group of Galaxy smart-phones having the same version of software located in Seoul. The selection request can be a following request. That is, the device connecting apparatus receives, from the first device, a request to follow a group of the plurality of second devices according to predetermined conditions required by the first device. The first device is a follower and the group of the second devices is a followee. In the present embodiment, following means following between devices, not between users.

In operation S120, the device connecting apparatus generates a virtual device channel connecting the plurality of second devices and the first device to each other. Then, the virtual device channel is generated for transmitting data between the first device and the second device group. If the selection request is the following request, the device connecting apparatus sets a following relationship between the first device, that is, the follower, and the second device group, that is, the followee, in response to the request. When the following relationship is set, the device connecting apparatus receives predetermined information from the second device group, that is, the followee, and transmits the received information or information obtained by processing the received information to the first device, that is, the follower.

As shown in FIG. 1, the device can generate a group of devices including anonymous users actively.

Figure 2:
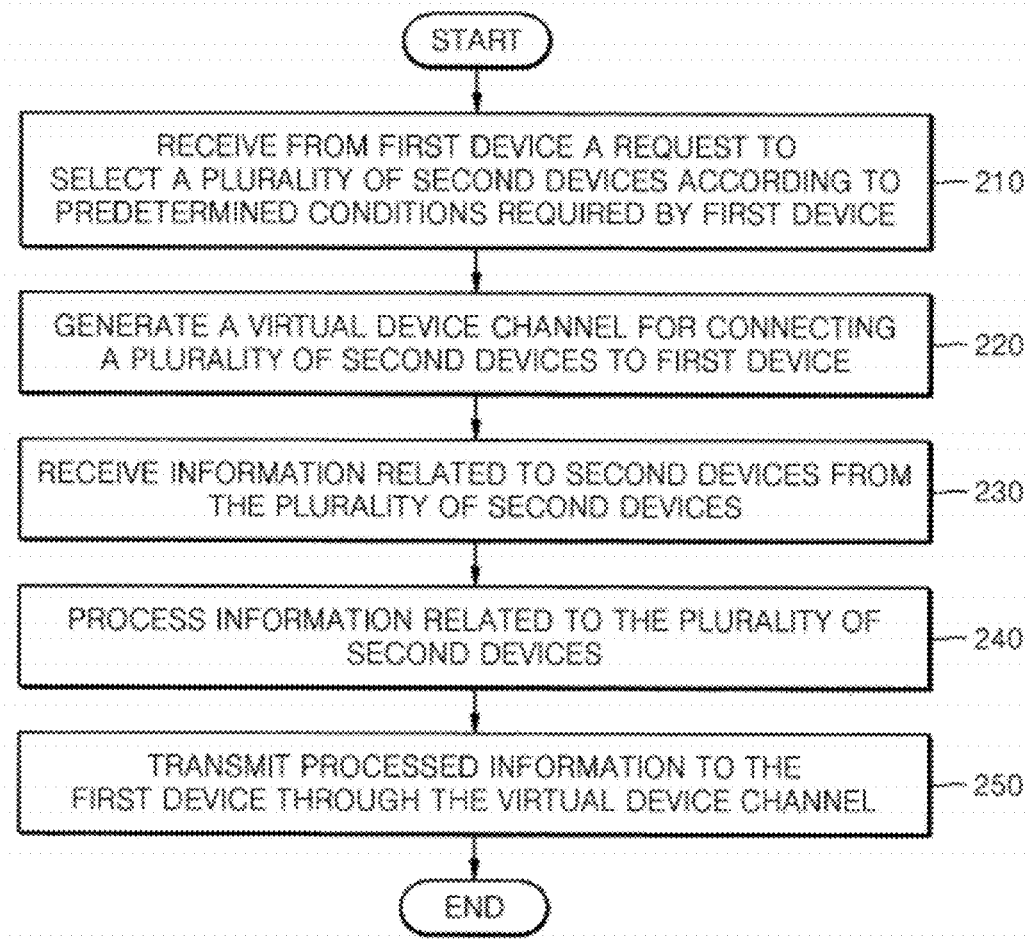
FIG. 2 illustrates a method of connecting devices according to an embodiment of the present invention.

FIG. 2 illustrates a process for connecting devices according to an embodiment of the present invention.

Referring to FIG. 2, operations S210 and S220 are the same as the operations S110 and S120 of FIG. 1, and thus, detailed descriptions thereof are not provided here.

In operation S230, the device connecting apparatus receives information about the second devices from the plurality of second devices. The device connecting apparatus receives data generated in the second device group. For example, the device connecting apparatus receives application usage history data from each of the second devices. The information related to the second device refers to event information collectable by the second device, for example, device specification information, device state information, device sensing information, device operation information, user event information, user information in the device, or device usage information. The device specification information is information such as a device identification (ID), a device type, a device name, or a device production date, that is, the information determined when fabricating or selling the device. The device state information is information obtained from a device system, for example, setting information of the device, a central processing unit (CPU) usage amount, or a CPU usage time. The device sensing information is information obtained from a sensor formed in the device, for example, location information such as global positioning system (GPS) coordinates or an external temperature. The device operation information is information representing a current operation of the device. The user event information is information representing that the device reaches a certain operation or state of the device designated by the user. The user information in the device is user information such as a user ID or a personal information management system (PIMS). The device usage information is history information representing the usage of a certain function by the user. However, the above information is merely exemplary, and the present invention is not limited thereto.

In operation S240, the device connecting apparatus processes the information related to the second device. The device connecting apparatus stores and analyses the received information related to the second devices received from the second device group to process the information. For example, the device connecting apparatus receives the information from the Galaxy® smart-phones, that is, the second device group, and can process the information as information relating to an application that is the most favorite between the users of the Galaxy® smart-phones.

In addition, the device connecting apparatus generates a transmittable message by using the processed information. More particularly, the second device converts a format of the processed information to structured machine readable language that is comprehensible to the device. In the present specification, a structured message comprehensible to the device is referred to as a device message. In the present embodiment, the structured message type that is comprehensible by the device is one of JavaScript Object Notation (JSON), eXtensible MarkUp Language (XML), Resource Description Framework (RDF), or Web Ontology Language (OWL).

Otherwise, the device connecting apparatus can generate the information related to the second devices transmitted from the second device group without processing the information.

In operation S250, the device connecting apparatus transmits the processed information to the first device through the virtual device channel. The device connecting apparatus transmits the processed information as the device message format to the first device through the virtual device channel. Otherwise, the device connecting apparatus can transmit the information related to the second devices that is not processed to the first device in the device message format.

According to the embodiment illustrated in FIG. 2, the device can generate the group of devices including anonymous users actively, and receive statistical information easily.

Figure 3:
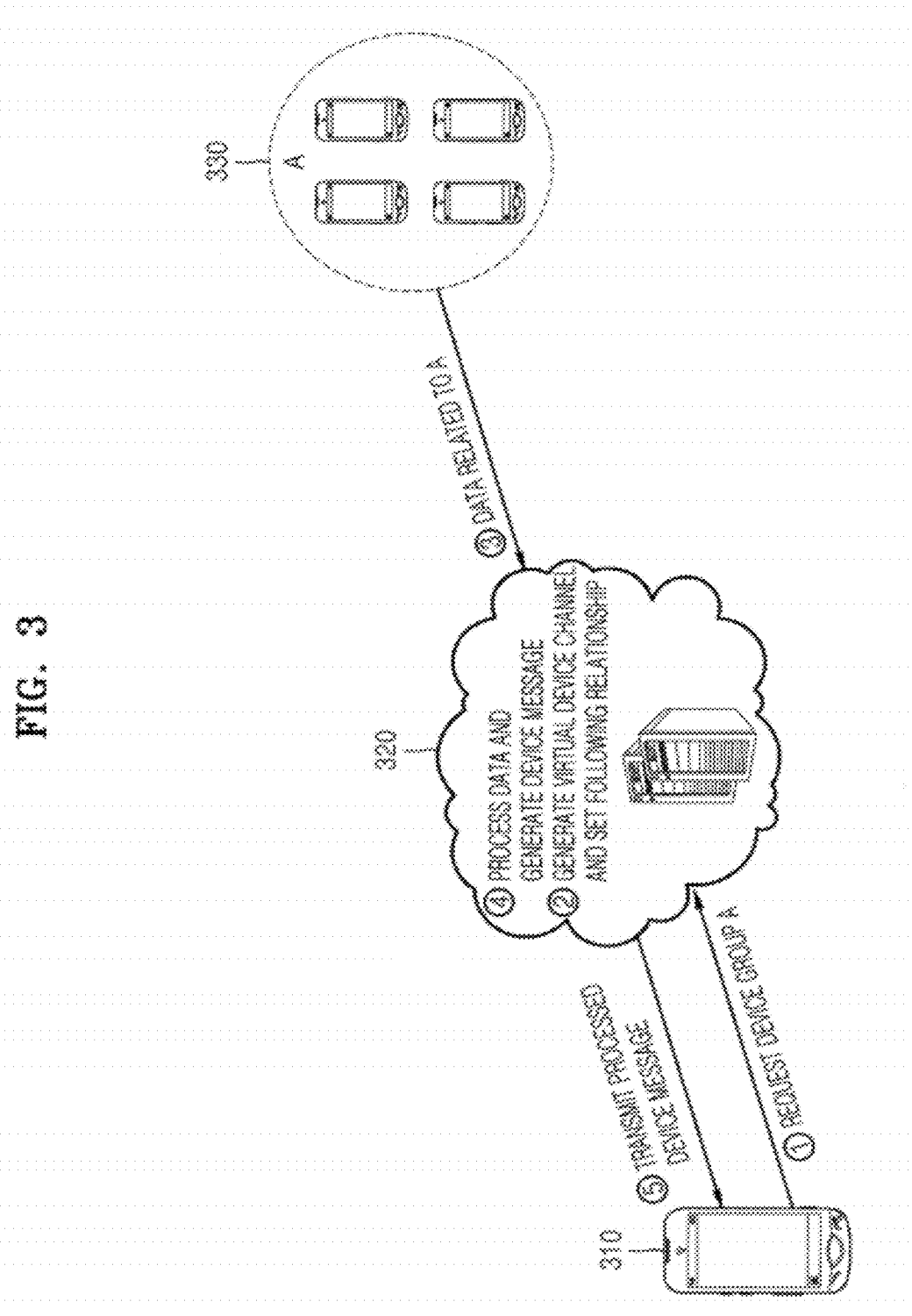
FIG. 3 illustrates a process for connecting devices illustrated in FIG. 2.

FIG. 3 illustrates for connecting devices illustrated in FIG. 2.

Referring to FIG. 3, a mobile device 310 that is a first device transmits a request to follow a group A of second devices 330 to a server 320 that is a device connecting apparatus. The server 320 generates a virtual device channel between the mobile device 310 and the second device group A 330. That is, the mobile device 310 is a follower and the second device group A 330 is a followee. The server 320 receives data related to the group A from the second device group A 330, and processes the data. For example, when the server 320 receives data about application user history from the second device group A 330, the server 320 processes the data as information about the application that is the most frequently used in the second device group A 330. Thereafter, the server 320 converts the processed data into a device message, and transmits the device message to the mobile device 310.

Figure 4:
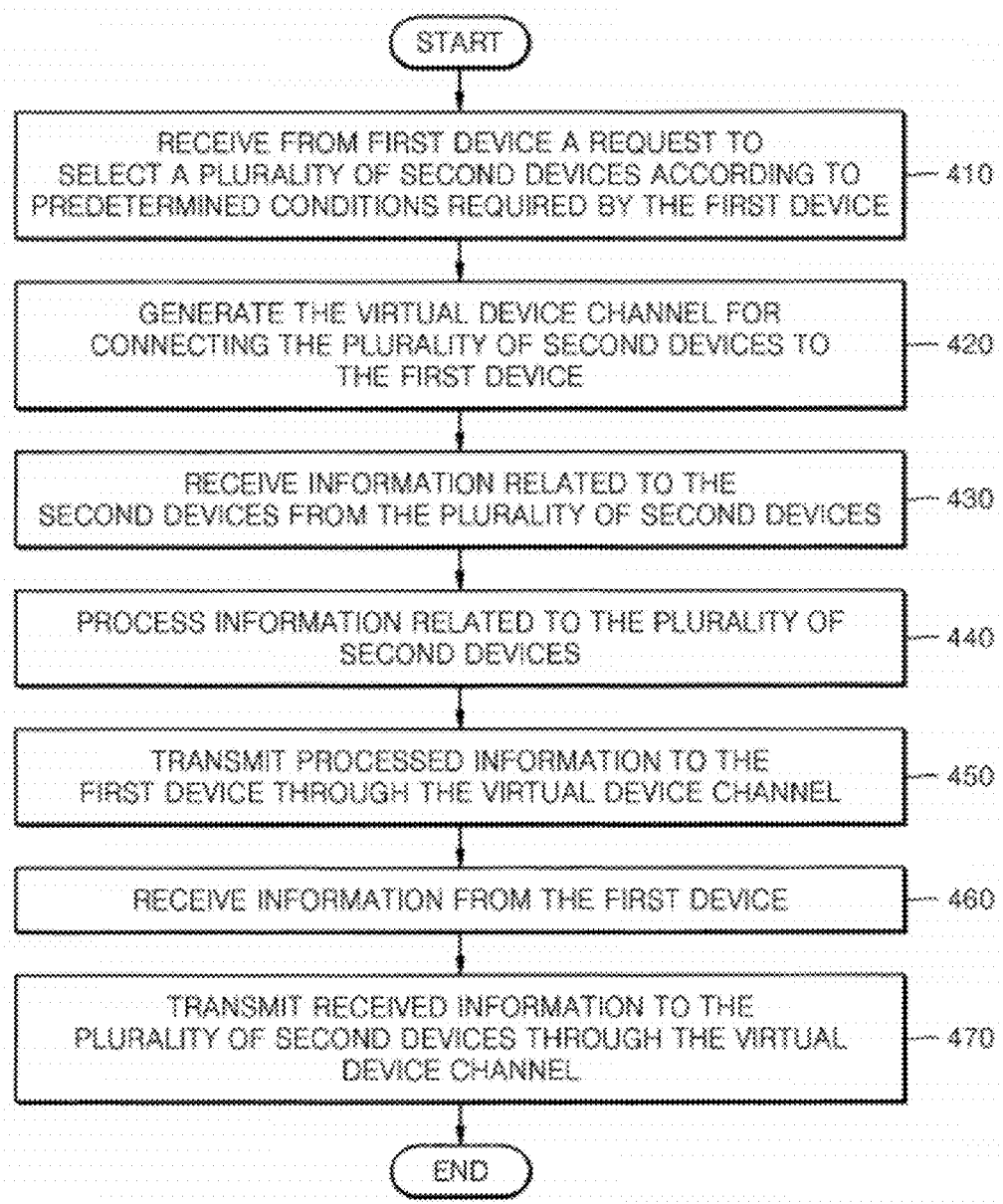
FIG. 4 illustrates a process for connecting devices according to an embodiment of the present invention.

FIG. 4 illustrates a process for connecting devices according to another embodiment of the present invention.

Referring to FIG. 4, operation S410 is the same as the operation S110 of FIG. 1, and thus, detailed descriptions are not provided.

In operation S420, a device connecting apparatus sets a virtual device channel connecting a plurality of second devices to a first device. Then, the virtual device channel is generated for transmitting data between the first device and a group of the second devices. Unlike the embodiment illustrated in FIG. 1, if the selection request is a following request, the device connecting apparatus sets a following relationship between the first device that is a follower and the second device group that is a followee, and a following relationship between the first device that is a followee and the second device group that is a follower in response to the request to follow. That is, a bi-directional following relationship is set between the first device and the second device group.

Operations S430 through S450 are the same as the operations S230 through S250 illustrated in FIG. 2, and thus, descriptions of the operations S430 through S450 are not provided.

In operation S460, the device connecting apparatus receives information about the second device group from the first device. For example, the information can include advertisement or coupons required in the second device group.

In operation S470, the device connecting apparatus transmits the information to the plurality of second devices through the virtual device channel.

According to the embodiment of FIG. 4, the first device can transmit target advertisement to the selected device group due to the bi-directional following relationship.

Figure 5:
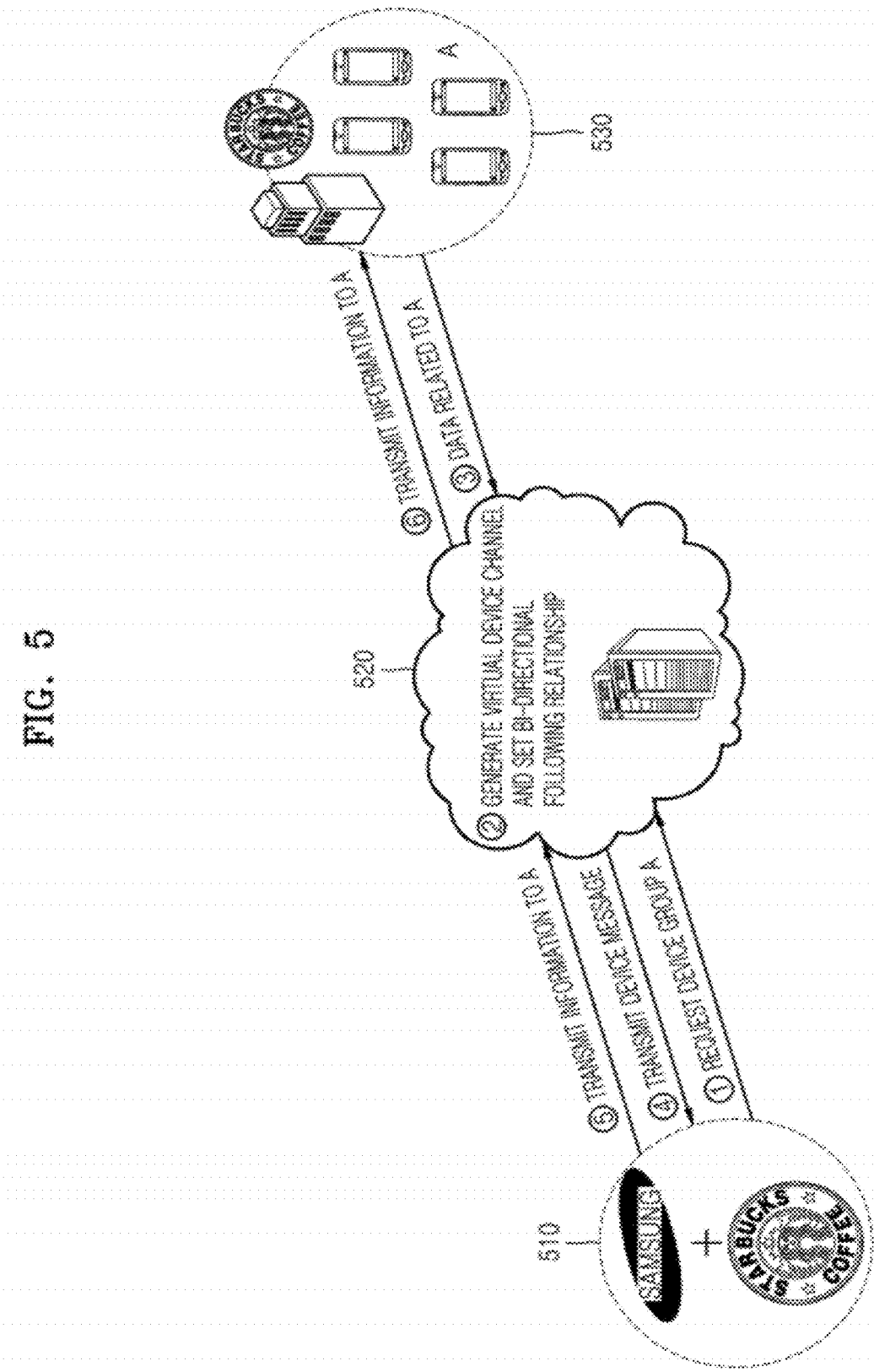
FIG. 5 illustrates a process for connecting devices illustrated in FIG. 4.

FIG. 5 illustrates an example of the method illustrated in FIG. 4.

Referring to FIG. 5, a first device 510 relating to cooperative marketing between companies transmits to a server 520 that is the device connecting apparatus a request to connect to a second device group A 530. For example, the first device 510 related to cooperative marketing of Samsung Electronics and Starbucks® coffee requests to connect to a Samsung Galaxy® smart-phone existing near a Starbucks® coffee shop. The connecting request can be a following request. The server 520 generates a virtual device channel between the first device 510 and the second device group A 530. Thus, a bi-directional following relationship is set between the first device 510 that is either the follower or the followee and the second device group A 530 that is either the followee or the follower. The server 520 receives data related to the second device group A 530 from the second device group A 530, and converts the data into the device message with or without processing the data and transmits the device message to the first device 510. For example, when the server 520 receives location information from the second device group A 530, the server 520 converts the location information into a device message and transmits the device message to the first device 510. Thereafter, the first device 510 transmits information to be provided to the second device group A 530 to the server 520, and the server 520 transmits the information to the second device group A 530. For example, the first device 510 analyses the received location information, and then, the first device 510 transmits advertisement or coupon information related to Starbucks® coffee to the server 520 and the server 520 transmits the advertisement or coupon information to the second device group A 530.

Figure 6:
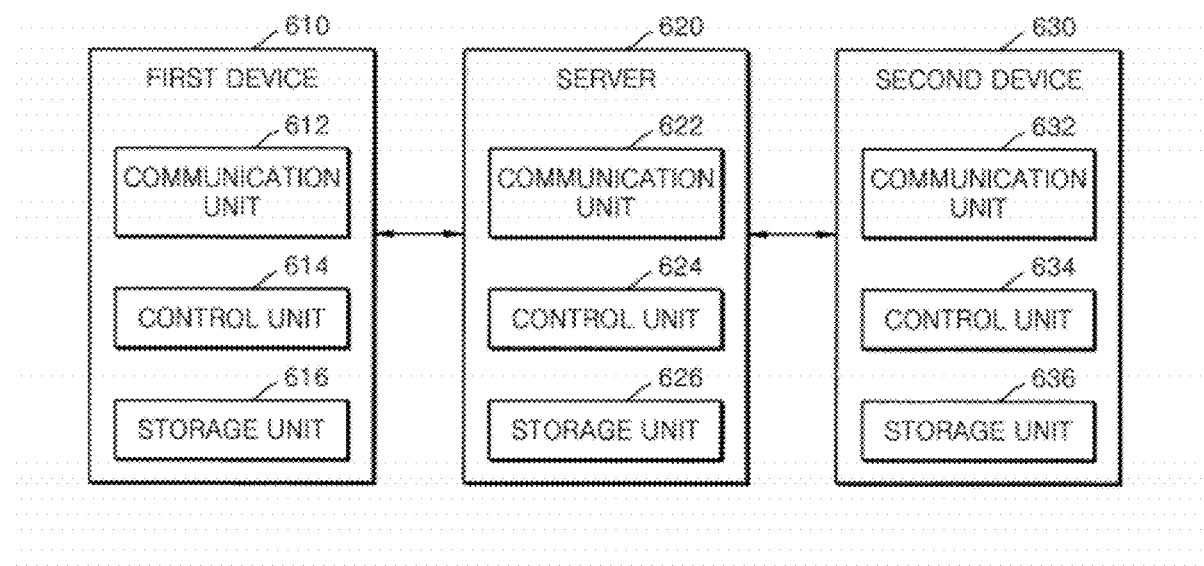
FIG. 6 illustrates an apparatus for connecting devices according to an embodiment of the present invention.

FIG. 6 illustrates a device connecting apparatus according to an embodiment of the present invention.

Referring to FIG. 6, a server 620 that is the device connecting apparatus connects a first device 610 and a second device 630 to each other. Referring to FIG. 6, the second device 630 is a group of a plurality of devices. The first device 610, the server 620, and the second device 630 respectively include communication units 612, 622, and 632, control units 614, 624, and 634, and storage units 616, 626, and 636.

The communication unit 622 of the server 620 receives a request to select a plurality of second devices 630 from the first device 610 according to predetermined conditions required by the first device 610. The control unit 614 of the first device 610 does not request to select a certain single device, but does request to select a plurality of devices included in a range, that is, a device group to the server 620 via the communication unit 612 of the first device 610. For example, the first device 610, such as a Galaxy® smartphone, requests to select a group of Galaxy® smartphones having the same version of software. The selection request can be a following request. That is, the communication unit 622 of the server 620 receives a request to follow the second device group according to predetermined conditions required by the first device 610 from the first device 610. The first device 610 becomes a follower, and the second device group 630 becomes a followee. In the present embodiment, the following relationship is set between the devices, not between users.

The control unit 624 of the server 620 generates a virtual device channel for connecting the plurality of second devices 630 to the first device 610. Then, the virtual device channel for transmitting data between the first device 610 and the second device 630 group is generated. If the selection request is the following request, the control unit 624 of the server 620 sets the following relationship between the first device 610 that is the follower and the second device 630 group that is the followee in response to the following request. When the following relationship is set, device connecting apparatus receives predetermined information from the second device 630 group that is the followee, and transmits the received information or information obtained by processing the received information to the first device 610 that is the follower. In another example, the control unit 624 of the server 620 sets a following relationship between the first device 610 that is the follower and the second device group 630 that is the followee and a following relationship between the first device 610 that is the followee and the second device 630 group that is the follower, in response to the following request. That is the bi-directional following relationship between the first device 610 and the second device 630 group can be set.

The communication unit 622 of the server 620 receives information related to the plurality of second devices 630 from the plurality of second devices 630. The device connecting apparatus receives the data generated in the second device 630 group. For example, the communication unit 622 receives data about application using history from the second device 630 group. The information relating to the second device is the event information that can be collected by the second device group 630, and can include device specification information, device state information, device sensing information, device operation information, user event information, user information in the device, or device usage information. The device specification information is information such as a device ID, a device type, a device name, or a device production date, that is, the information determined when fabricating or selling the device. The device state information is information obtained from a device system, for example, setting information of the device, a CPU usage amount, or a CPU usage time. The device sensing information is information obtained from a sensor formed in the device, for example, location information such as GPS coordinates or an external temperature. The device operation information is information representing a current operation of the device. The user event information is information representing that the device reaches a certain operation or state of the device designated by the user. The user information in the device is user information such as a user ID or a PIMS. The device usage information is history information representing the usage of a certain function by the user. However, the above information is merely exemplary, and the present invention is not limited thereto.

The control unit 624 of the server 620 processes the received information relating to the plurality of second devices 630. The control unit 624 of the server 620 stores the information related to the second device transmitted from the second device 630 group in the storage unit 626 of the server 620, and analyses the information to process it. For example, the server 620 receives information from the Galaxy® smartphones that are the second devices 630, and after that, can process the information as information about the application that is the most frequently used between users of the Galaxy® smartphones.

The control unit 624 of the server 620 generates a message that is transmittable by using the processed information. In more detail, the control unit 824 of the server 620 converts the processed information into a structured machine readable language format that is comprehensible to the device. In the present embodiment, a structured message type that is comprehensible to the device is one of JavaScript Object Notation (JSON), eXtensible Markup Language (XML), Resource Description Framework (RDF), or Web Ontology Language (OWL).

Otherwise, the control unit 624 of the server 620 can generate the device message without processing the information related to the second devices 630 transmitted from the second device 630 group.

The communication unit 622 of the server 620 transmits the processed information to the first device 610 through the virtual device channel. The communication unit 622 of the server 620 transmits the information processed as the device message format to the first device 610 through the virtual device channel. Otherwise, the communication unit 624 can transmit the information related to the second device 630 that is not processed to the first device 610 as the device message format.

If the following relationship is bi-directional, the communication unit 622 of the server 620 receives information related to the second device 630 group, for example, advertisement or coupon information required by the second device 630 group, from the first device 610, and can transmit the received information to the second device 630 group via the virtual device channel.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers of ordinary skill in the art to which the present invention pertains.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of connecting devices, the method comprising:
   receiving, from a first device, a request to select a plurality of second devices according to predetermined conditions required by the first device;
   generating a virtual device channel for connecting the plurality of second devices to the first device;
   receiving information related to the plurality of second devices from the plurality of second devices;
   transmitting the received information related to the plurality of second devices to the first device via the virtual device channel;
   receiving information from the first device; and
   transmitting the received information to the plurality of second devices via the virtual device channel,
   wherein the information received from the first device is generated by the first device based on the received information related to the plurality of second devices.

2. The method of claim 1, further comprising:
   processing the received information related to the plurality of second devices,
   wherein the transmitting of the received information related to the plurality of second devices to the first device comprises transmitting the processed information to the first device via the virtual device channel.

3. The method of claim 2, wherein at least one of the information related to the plurality of second device and the processed information is formed as a structured message in a machine readable language.

4. The method of claim 3, wherein the structured message is formed in one of javascript object notation (JSON), eXtensible markup language (XML), resource description framework (RDF), or Web ontology language (OWL).

5. The method of claim 1, wherein the information related to the plurality of second device is the location information of the plurality of second devices.

6. The method of claim 1, wherein the request to select comprises a request to follow the plurality of second devices, and the method further comprising setting a following relationship between the plurality of second devices and the first device.

7. The method of claim 6, wherein the setting of the following relationship between the first device and the plurality of second devices comprises setting a following relationship so that the first device follows the plurality of second devices.

8. The method of claim 7, wherein the setting of the following relationship between the first device and the plurality of second devices comprises setting a following relationship so that the plurality of second devices follows the first device.

9. An apparatus for connecting devices, the apparatus comprising:

a communication unit configured to receive, from a first device, a request to follow a plurality of second devices according to predetermined conditions required by the first device; and a control unit configured to generate a virtual device channel that connects the plurality of second devices to the first device and sets a following relationship between the first device and the virtual device, wherein the communication unit is configured to receive information related to the plurality of second devices from the plurality of second devices and transmit the received information related to the plurality of second devices to the first device via the virtual device channel, wherein the communication unit is configured to receive information from the first device and transmit the received information to the plurality of second devices via the virtual device channel, and wherein the information received from the first device is generated by the first device based on the received information related to the plurality of second devices.

10. The apparatus of claim 9, wherein the control unit is configured to set a following relationship so that the first device follows the plurality of second devices.

11. The apparatus of claim 10, wherein the control unit is configured to process the received information related to the plurality of second devices and transmit the processed information to the first device via the communication unit.

12. The apparatus of claim 11, wherein the processed information is formed as a structured message in a machine readable language.

13. The apparatus of claim 12, wherein the structured message is formed in one of javascript object notation (JSON), eXtensible markup language (XML), resource description framework (RDF), or Web ontology language (OWL).

14. The apparatus of claim 10, wherein the control unit is configured to set the following relationship so that the plurality of second devices follows the first device.

15. The apparatus of claim 14, wherein the communication unit is configured to receive information related to the plurality of second devices and transmit the received information related to the plurality of second devices to an external device.

16. The apparatus of claim 15, wherein the communication unit is configured to receive information from the first device and transmit the received information to the plurality of second devices.

17. The apparatus of claim 15, wherein the information transmitted to the plurality of second devices is formed as a structured message in a machine readable language.

18. The apparatus of claim 17, wherein the structured message is formed in one of javascript object notation (JSON), eXtensible markup language (XML), resource description framework (RDF), or Web ontology language (OWL).

* * * * *